United States Patent [19]

Weber et al.

[11] Patent Number: 4,776,189
[45] Date of Patent: Oct. 11, 1988

[54] STEERING LOCK FOR BLOCKING THE ROTARY MOVEMENT OF A MOTOR VEHICLE STEERING SHAFT

[75] Inventors: Günter Weber, Wuppertal; Michael Leng, Herborn-Schönbach, both of Fed. Rep. of Germany

[73] Assignee: Neiman, Courbevoie, France

[21] Appl. No.: 65,338

[22] Filed: Jun. 22, 1987

[30] Foreign Application Priority Data

Jul. 8, 1986 [DE] Fed. Rep. of Germany ....... 3622904

[51] Int. Cl.$^4$ ............................................. B60R 25/02
[52] U.S. Cl. ........................................ 70/182; 70/185; 70/252
[58] Field of Search ........................... 70/252, 182–189

[56] References Cited

U.S. PATENT DOCUMENTS

| | | | |
|---|---|---|---|
| 533,680 | 2/1895 | Sullivan et al. | 70/185 |
| 620,221 | 2/1899 | Breeze | 70/185 X |
| 797,818 | 8/1905 | McCreary | 70/183 |
| 1,324,457 | 12/1919 | McGiff et al. | 70/183 |
| 1,498,940 | 6/1924 | Wheeler | 70/185 |
| 2,874,562 | 2/1959 | Cross | 70/185 X |
| 4,576,024 | 3/1986 | Weber | 70/186 X |
| 4,584,857 | 4/1986 | Weber | 70/184 |
| 4,658,610 | 4/1987 | Weber | 70/182 X |

FOREIGN PATENT DOCUMENTS

| | | | |
|---|---|---|---|
| 0135763 | 4/1985 | European Pat. Off. | 70/252 |
| 3535945 | 4/1987 | Fed. Rep. of Germany | 70/186 |
| 463048 | 4/1951 | Italy | 70/185 |
| 8304228 | 12/1983 | World Int. Prop. O. | 70/252 |
| 8304227 | 12/1983 | World Int. Prop. O. | 70/252 |

*Primary Examiner*—Gary L. Smith
*Assistant Examiner*—Suzanne L. Dino
*Attorney, Agent, or Firm*—Herbert Dubno

[57] ABSTRACT

A steering lock is disclosed for blocking the rotary movement of a motor-vehicle steering shaft, with at least two locking bolts which are movable close to or at a short distance from one another and next to one another in guides and which, in a position blocking the steering shaft, reach into a recess in the steering shaft by means of a front end face and are movable away from the steering shaft into a non-blocking position in their longitudinal extension. The particular guide (17) is so wide that the locking bolt (13, 14) is tiltable in this. A side wall (19) of the locking-bolt guide (17) has a projection (21) or set-off portion, against which the locking bolt (13, 14) rests by means of a projection or an edge (22) in the blocking and tilted position, in order to secure the blocking position.

7 Claims, 1 Drawing Sheet

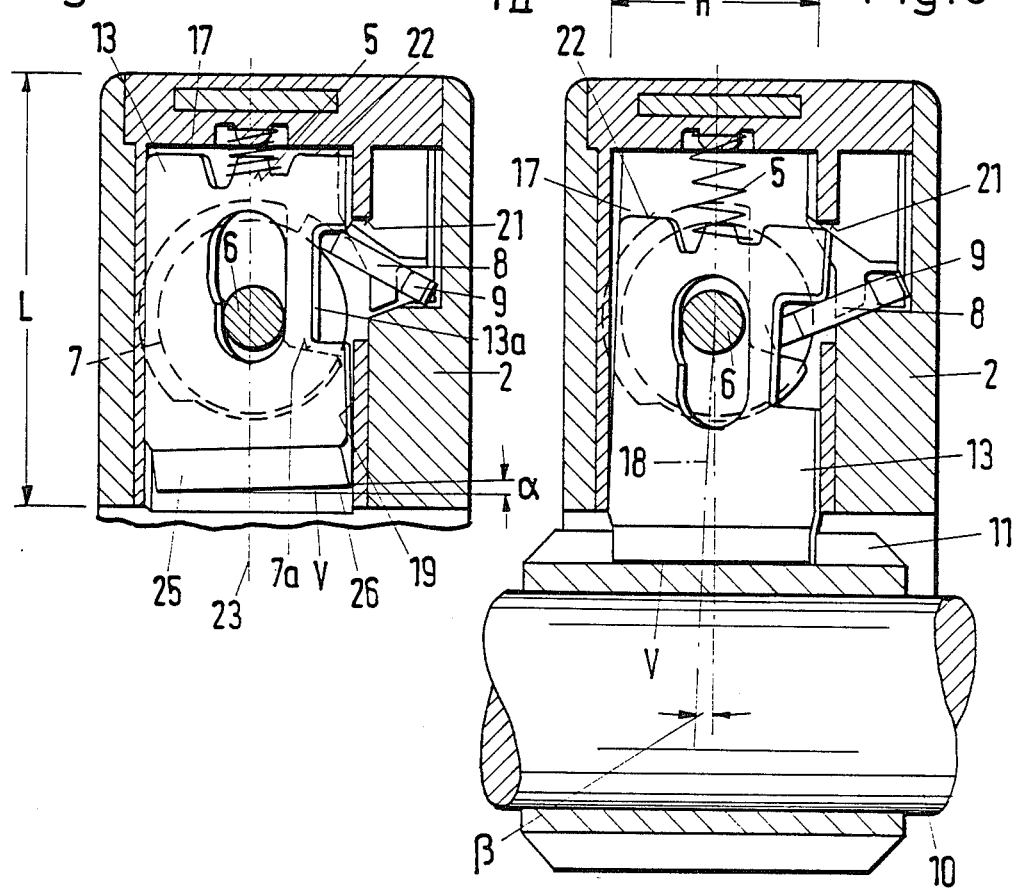

STEERING LOCK FOR BLOCKING THE ROTARY MOVEMENT OF A MOTOR VEHICLE STEERING SHAFT

BACKGROUND OF THE INVENTION

The invention relates to a steering lock for blocking the rotary movement of a motor-vehicle steering shaft, with at least two locking bolts which are movable close to or at a short distance from one another and next to one another in guides and which, in a position blocking the steering shaft, reach into a recess in the steering shaft by a front end face and are movable away from the steering shaft into a non-blocking position in their longitudinal extension.

Such a steering lock is known from DE No. 3,333,648 A1. In this known steering lock, in special cases it can happen that as a result of manipulations by unauthorized persons or as a result of extreme vibrations the locking bolts come out of the blocking position and thus release the steering shaft. This is assisted by the fact that the radial side faces of the recesses of the steering shaft, into which the locking bolts engage in the blocking position, diverge from one another and the front side faces of the locking bolts extend correspondingly obliquely at an angle. If this angle is too steep, the friction is too high when the locking bolts are pulled out. If this angle is too low, there is no longer any self-retention, and violent twisting of the steering, column results in the locking bolts being pushed out into the released position.

The object of the invention is to improve a steering lock of the type mentioned in the introduction, in such a way that the locking bolts remain safely in the blocking position even under manipulations or vibrations.

SUMMARY OF THE INVENTION

According to the invention, this object is achieved because the particular guide is so wide that the locking bolt is tiltable in it, and because a side wall of the locking-bolt guide has a projection (21) or setoff portion, against which the locking bolt rests by means of a projection or an edge in the blocking and tilted position, in order to secure the blocking position.

As a result, the locking bolt and its guide form a one-way positive detent device against a pushing movement of the locking bolt out of the blocking position, thus ensuring that the locking bolt leaves the blocking position only by means of the driver engaging on the locking bolt and not as a result of manipulations or vibrations. This positive detent device thus ensures that, when the key is withdrawn, it is not possible to leave the blocking position of the locking bolt without a pivoting or tilting of the locking bolt, and this pivoting or tilting is produced solely by the driver which additionally shifts the locking bolt from the blocking position into the non-blocking position.

This construction therefore offers the greatest certainty that the locking bolt will always remain in its blocking position.

It is especially advantageous, at the same time, if the front end face of the locking bolt, engaging in the recess in the steering shaft, forms an acute angle α with the face perpendicular to the longitudinal axis of the locking bolt, this angle α corresponding approximately to the angle β, through which the locking bolt pivots from the released untilted position into the tilted blocking position. This angle ensures that, when the steering shaft rotates, the pushing force exerted on the locking bolt by the recess in the steering shaft, because of the wedge-type transmission provided there, causes the locking bolt to tilt or pivot into the position, in which the locking bolt rests against the projection of the guide or is not far away from it and therefore cannot assume the pivoted position, in which it can be shifted into the released position. The angle can be 1 to 5 degrees, especially 2 degrees. Additionally or alternatively, this can also be obtained if a spring rests against the locking bolt and presses the latter into the tilted position.

It is advantageous if the locking bolt is movable from the blocking position into the non-blocking position by means of a driver part, the locking bolt being pivotable from the tilted position into the untilted position by the driver part. In this case, the driver part can be a pivotable or displaceable plate, the axis of rotation of which is approximately at right-angles to the side faces of the plate-shaped locking bolt.

BRIEF DESCRIPTION OF THE DRAWINGS

An exemplary embodiment of the invention is illustrated in the drawings and described in detail below.

In the drawings:

FIG. 1 shows an axial longitudinal section through the steering lock in the blocking position of the locking bolts, FIG. 2 shows a section according to II—II in FIG. 1 in the released position, FIG. 3 shows a section according to II—II in FIG. 1 in the blocking position.

DETAILED DESCRIPTION

The steering lock 1 has a tubular lock housing 2, in which a locking-cylinder housing 3 is arranged in a non-displaceable manner. A cylinder core 4 having tumblers is arranged in the locking-cylinder housing 3 so as to be axially movable and rotatable about its axis and can be shifted by a key only when the key is inserted. Fastened coaxially to the cylinder core 4 is an axle-shaped extension 6, on which an essentially circular curved or cam disc 7 is arranged at right-angles and fixed coaxially. The disc 7 has, over an angle of rotation of approximately 70 to 90 degrees, a sector-shaped recess 7a, into which a driver plate 8 pivots when the recess 7a is located opposite the driver plate 8 in the blocking position of the cylinder core.

The driver plate 8 can be pivoted out of the recess 7a and consequently out of the radial position relative to the disc 7 about a pivot pin 9 parallel to the axis of the cylinder core and then rests on the periphery in the form of a part circle of the disc 7.

The locking bolts 13, 14 are arranged near to one another radially relative to the steering shaft 10 and with their side faces parallel to the steering-shaft axis. They are therefore not at right-angles to the extension 6, but at an angle of 5 to 10 degrees. The locking bolts 13, 14 each have, in their end face turned towards the driver plate 8, a recess 13a, 14a, into which reaches the driver plate 8. As a result of a movement of the plate 8, the locking bolts are moved radially relative to the steering shaft in their longitudinal direction, a movement out of the blocking position away from the steering shaft taking place each time against the pressure of a helical compression spring 5 resting on the sides of the locking bolts located opposite the steering shaft. The driver plate 8 can also be displaceable, in order to actuate the locking bolts.

On the side of the curved or cam disc 7, located opposite the locking bolts 13, 14, an annular disc 16 rests against the disc 7 and is pressed against the latter by means of a conical helical compression spring. Two annular discs 16, 16a set the blocking stand-by position of the lock. -5 The locking bolts 13, 14 rest respectively in pocket-shaped or chamber-like guides 17 which in terms of their width B and their height H correspond approximately to the width and height of the particular locking bolt and the length L of which is greater than the length of the locking bolt. The locking bolts 13, 14 are displaceable in the direction of their longitudinal axis 18 within these guides 17. When a locking bolt 13 is in the blocking position shown in FIG. 2, the front end V of the locking bolt reaches into a recess 11 in the steering shaft 10. In this position, the spring 5 presses the locking bolt against that side wall of the guide 17 which is nearest to the driver plate 8 or to its pivot pin 9 and which is parallel to the latter. This side wall 19 forms a sloping recess and consequently a step-shaped projection 21 facing the steering shaft. The locking bolt engages behind this projection 21 by means of its side or edge 22 facing away from the steering shaft, so that this edge 22 prevents the possibility that the locking bolt will assume the released position counter to the pressure of the spring 5 as a result of manipulations or vibrations.

The projection 21 and edge 22 thus form a positive detent device which is one-way, that is to say acts in a pushing direction, and which can be overcome when the driver plate 8 not only shifts the locking bolt 13 counter to the effect of the spring 5, but at the same time also pivots or tilts it away from the projection 21 through the angle 8. To ensure that, in the blocking position, the locking bolt 13 always comes up against the side wall 19 of the guide by means of its side face, the spring 5 exerts pressure on the rearside or edge 22 of the locking bolt 13, its direction being oblique relative to the longitudinal axis of the locking bolt in its released position and to the longitudinal axis 23 of the guide 17. Furthermore, an inclined position of the locking bolt 13 is obtained as follows:

Not only does the front end V of the locking bolt 13 have two flattened portions 24, 25 and an end face 26 located between these, but this end face 26 and preferably the flattened portions 24, 25 are not at rightangles to the longitudinal axis 18 of the locking bolt, but at an angle α of approximately 1 to 5, especially 2 degrees, so that when these faces come up against the recess in the steering shaft the locking bolt is consequently tilted or pivoted, the edge 22 then coming behind to the projection 21. This also ensures that a shift of the locking bolt 13 as a result of the wedge-type transmission between the recess in the steering shaft and the flattened portions 24, 25 does not lead to a movement of the locking bolt into the released position, since the stop or projection 21 prevents this.

We claim:

1. Steering lock for blocking the rotary movement of a motor-vehicle steering shaft, comprising:

at least two adjacent locking bolts each including a front end face, an edge, and a longitudinal extension and a driver part having a cam means for moving said bolts, said bolts being movable by said driver part within close proximity to one another from one position blocking the steering shaft, reaching into a recess in the steering shaft by said front end face and to a second position away from the steering shaft into a non-blocking position;

a guide having a side wall and being sufficiently wide to accommodate said locking bolt while in a tilted position therein; and said side wall having a set-off portion thereof, said locking bolt resting by means of said edge against said set-off portion in the blocking and tilted position, in order to secure the blocking position.

2. Steering lock according to claim 1, wherein the front end face of the locking bolt, which is located in the recess of the steering shaft forms an acute angle α with a face perpendicular to a longitudinal axis of the locking bolt, this angle α corresponding approximately to the angle β, through which the locking bolt pivots from the released untilted position into the tilted blocking position.

3. Steering lock according to claim 2, wherein the angle α is 1 to 5 degrees.

4. Steering lock according to claim 1, further comprising a spring resting against the locking bolt and pressing the locking bolt into the tilted position.

5. Steering lock according to claim 1, wherein the locking bolt is pivotable from the tilted position into the untilted position by the driver part.

6. Steering lock according to claim 5, wherein the driver part is a pivotable and displaceable plate, said part having a pivot pin which is approximately at rightangles to side faces of the plate-shaped locking bolt.

7. Steering lock according to claim 4, wherein in the two positions of the locking bolt the effective axis of the spring is oblique relative to the longitudinal axis of the locking bolt.

* * * * *